United States Patent
Komura et al.

(10) Patent No.: US 9,815,482 B2
(45) Date of Patent: Nov. 14, 2017

(54) TRAIN-INFORMATION MANAGEMENT DEVICE AND TRAIN-CREW SUPPORT METHOD

(71) Applicant: MITSUBISHI ELECTRIC CORPORATION, Chiyoda-ku, Tokyo (JP)

(72) Inventors: Tetsuo Komura, Tokyo (JP); Takuya Sawa, Tokyo (JP); Toshiko Kadono, Tokyo (JP); Satoru Takahashi, Tokyo (JP); Koki Yoshimoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 90 days.

(21) Appl. No.: 14/892,053

(22) PCT Filed: May 20, 2013

(86) PCT No.: PCT/JP2013/063945
§ 371 (c)(1),
(2) Date: Nov. 18, 2015

(87) PCT Pub. No.: WO2014/188486
PCT Pub. Date: Nov. 27, 2014

(65) Prior Publication Data
US 2016/0207546 A1    Jul. 21, 2016

(51) Int. Cl.
*B61D 19/00*    (2006.01)
*B61L 27/00*    (2006.01)
*B61L 15/00*    (2006.01)

(52) U.S. Cl.
CPC .......... *B61D 19/00* (2013.01); *B61L 15/009* (2013.01); *B61L 15/0072* (2013.01); *B61L 27/0077* (2013.01); *Y02T 30/30* (2013.01)

(58) Field of Classification Search
CPC . B61L 15/0072; B61L 15/009; B61D 19/005; B61D 19/009; B61D 19/02; B61D 19/023; B61D 19/026; B61D 19/00
See application file for complete search history.

(56) References Cited

U.S. PATENT DOCUMENTS

2011/0029166 A1*  2/2011  Iga ............................ B61L 3/12
                                                        701/19
2013/0238175 A1*  9/2013  Kuroda ............... B61L 15/0072
                                                        701/19

(Continued)

FOREIGN PATENT DOCUMENTS

JP    56-008716 A    1/1981
JP    58-181981 A    10/1983

(Continued)

OTHER PUBLICATIONS

The extended European Search Report dated Aug. 18, 2016, by the European Patent Office in corresponding European Patent Application No. 13885316.3-1810. (7 pages).

(Continued)

*Primary Examiner* — Jason C Smith
(74) *Attorney, Agent, or Firm* — Buchanan Ingersoll & Rooney PC

(57) ABSTRACT

A motorman's cab in a train is provided with a plurality of door operating switches that open and close the train doors on the station-platform side in a fully-automatic manner, in a semi-automatic manner, or in a manner that open and close doors in sections. A central device includes an information control unit that specifies a stopping station where a train stops next on the basis of train information; selects a recommended door operating switch at the stopping station from among the door operating switches on the basis of an estimated passenger-number value, which is the number of passengers at the stopping station, as a recommended door (Continued)

operating switch for the stopping station; and then it displays display information that prompts the train crew to operate the selected door operating switch on a display device in the control platform.

6 Claims, 7 Drawing Sheets

(56) References Cited

U.S. PATENT DOCUMENTS

| | | | | |
|---|---|---|---|---|
| 2014/0336851 | A1* | 11/2014 | Kadono | H04L 41/0853 701/19 |
| 2014/0358337 | A1* | 12/2014 | Ikejima | B61L 15/0036 701/19 |
| 2016/0039438 | A1* | 2/2016 | Miyajima | B60L 15/40 701/19 |
| 2016/0046307 | A1* | 2/2016 | Miyajima | B60L 15/40 701/19 |
| 2016/0207546 | A1* | 7/2016 | Komura | B61D 19/00 |

FOREIGN PATENT DOCUMENTS

| | | |
|---|---|---|
| JP | 61-18554 A | 1/1986 |
| JP | 63-207765 A | 8/1988 |
| JP | 10-278788 A | 10/1998 |
| JP | 2001-253342 A | 9/2001 |
| JP | 2004-268891 A | 9/2004 |
| JP | 2007-216709 A | 8/2007 |
| JP | 2008-230482 A | 10/2008 |
| JP | 2012-016996 A | 1/2012 |
| KR | 10-2009-0087844 A | 8/2009 |
| WO | WO 2009/130961 A1 | 10/2009 |

OTHER PUBLICATIONS

International Search Report (PCT/ISA/210) dated Aug. 20, 2013, by the Japanese Patent Office as the International Searching Authority for International Application No. PCT/JP2013/063945.

Written Opinion (PCT/ISA/237) dated Aug. 20, 2013, by the Japanese Patent Office as the International Searching Authority for International Application No. PCT/JP2013/063945.

* cited by examiner

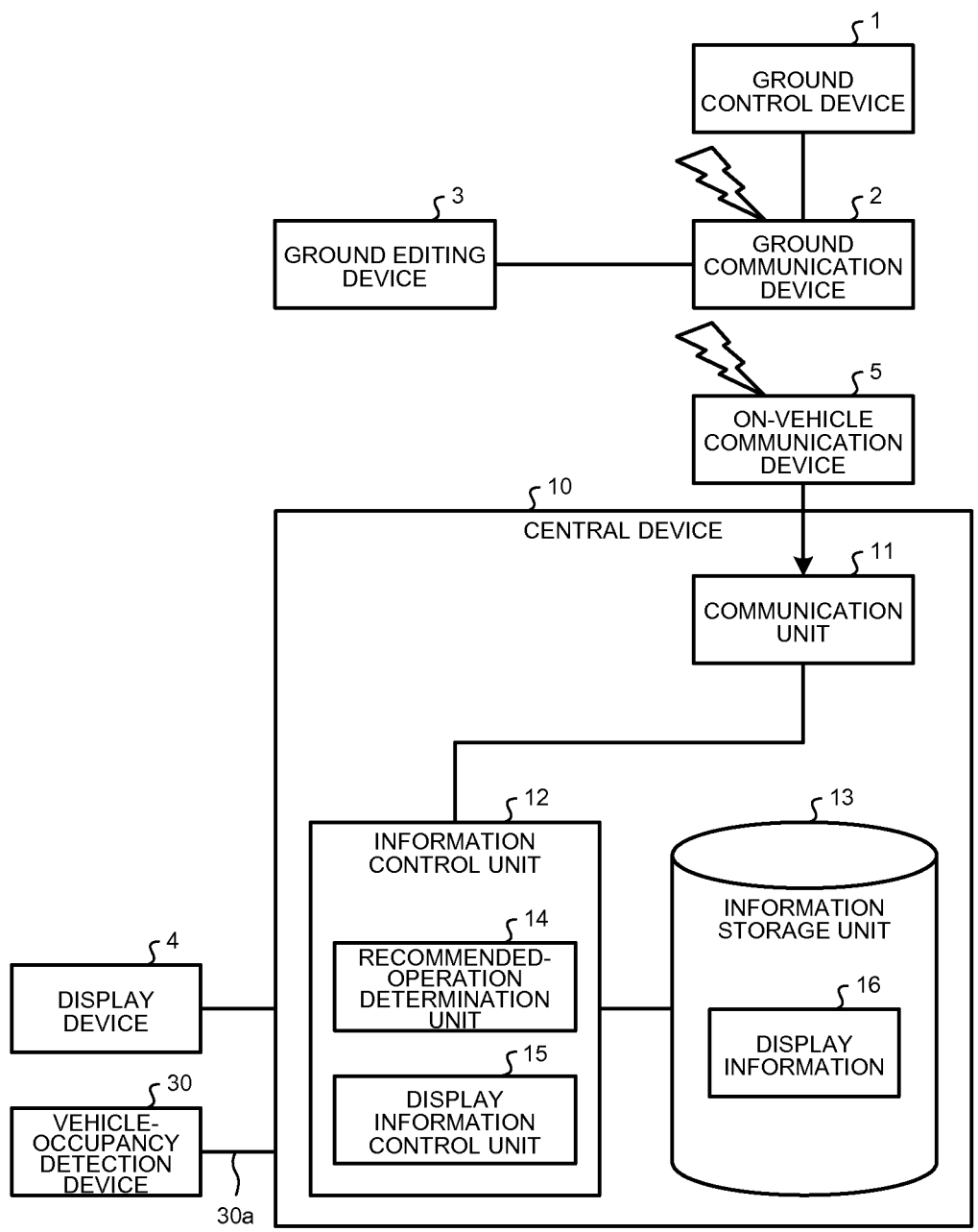

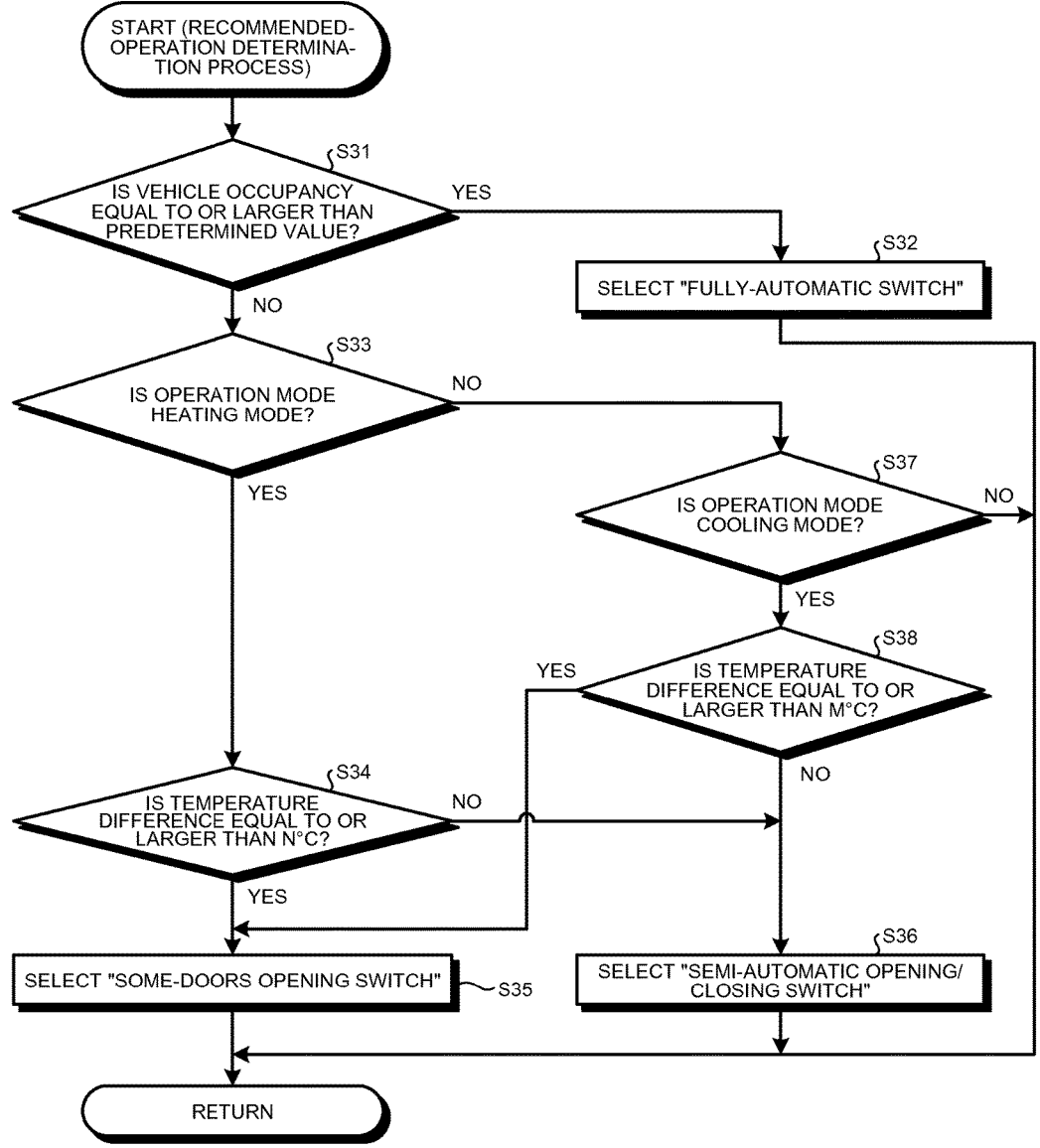

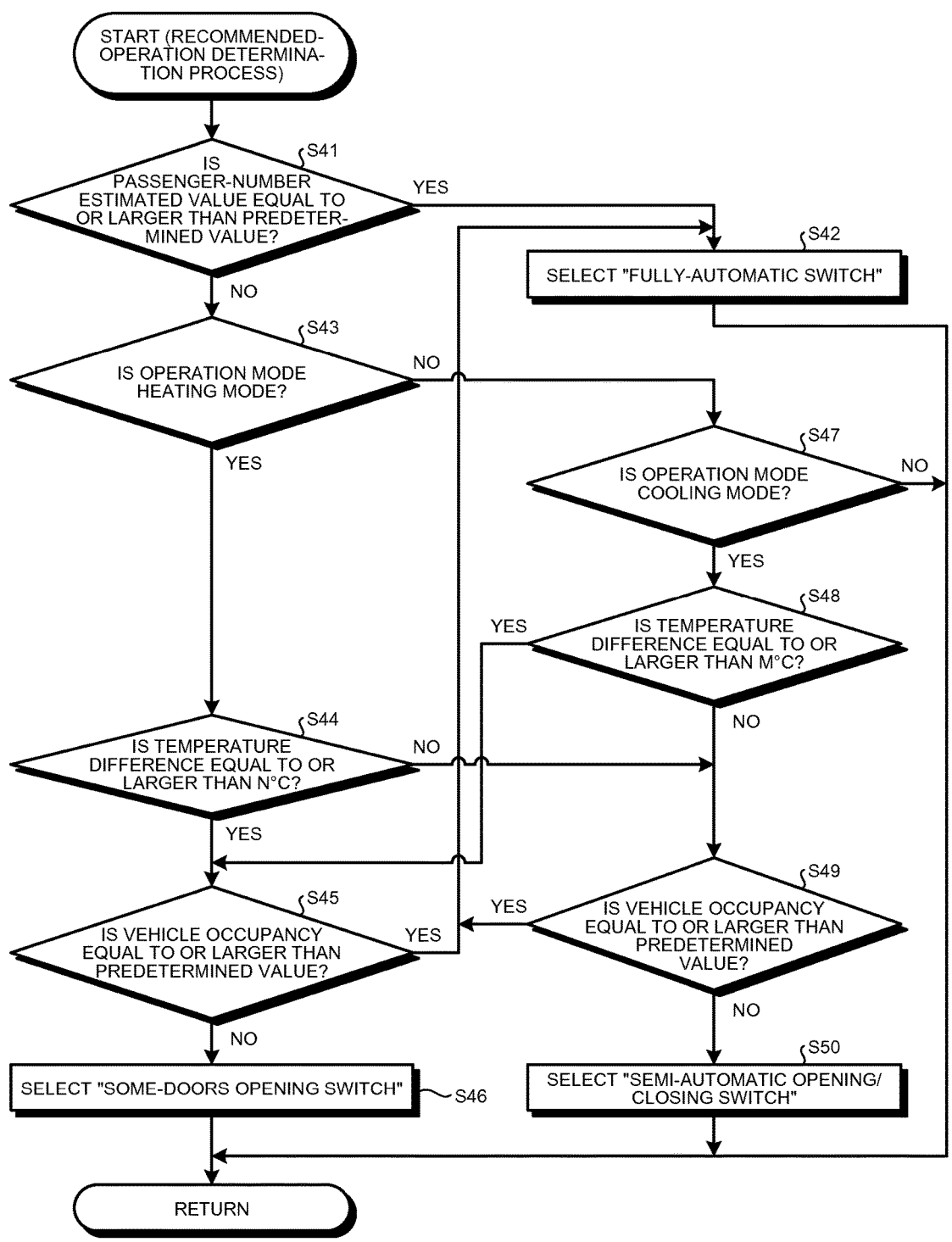

TRAIN-INFORMATION MANAGEMENT DEVICE AND TRAIN-CREW SUPPORT METHOD

FIELD

The present invention relates to a train-information management device and a train-crew support method.

BACKGROUND

In a motorman's cab in a train, for example, a door operating unit is provided next to a platform-side door. The door operating unit includes a fully-automatic switch enabling a fully-automatic state in which the train doors on the station-platform side can be simultaneously opened or simultaneously closed; a sectional door-opening switch for opening only some doors among a plurality of doors on one side of a vehicle and keeping the other doors closed; and a semi-automatic opening/closing switch enabling a semi-automatic state where passengers can open and close doors manually. The sectional door-opening switch and the semi-automatic opening/closing switch are used, for example, in order to maintain the air inside the train the same state when the train stops at a station for a long time, for example, because of a shuttle service or waiting for other express trains.

For example, if the semi-automatic opening/closing switch is selected when a train arrives at a station where it will stop, the doors are unlocked. With this configuration, when a passenger manually opens a door or operates an open switch near a door, only a specific door can be opened. In the semi-automated state of the door opening/closing operation, doors can be closed anytime by the operation of passengers irrespective of how long the train stops, and doors that are not used by passengers are not opened. When the sectional door-opening switch is selected, only some predetermined doors are opened. As a result, the efficiency of cooling and heating in the train can be improved, and energy consumption due to unnecessary opening and closing of doors can be reduced.

With the conventional technique described in Patent Literature 1 listed below, the configuration is such that, by using a semi-automatic door opening/closing unit, doors that have been opened are automatically closed after a predetermined time elapses. With this configuration, doors that have been opened by passengers can be automatically closed after a predetermined time elapses, and therefore it is possible to prevent doors from being left open while enabling a semi-automatic door opening/closing operation to be maintained. Furthermore, the state of the air in the train can be maintained while the safety of passengers is secured.

CITATION LIST

Patent Literature

Patent Literature 1: Japanese Patent Application Laid-open No. 2008-230482

SUMMARY

Technical Problem

However, when it is desirable to operate a sectional door-opening switch or a semi-automatic opening/closing switch because, for example, the number of passengers at some stations is relatively small, it is a member of the train crew who determines which operation of a door operating unit to use. The conventional techniques presented in Patent Literature 1 listed above are not configured to notify the train crew of the optimum operation details at a station where the train stops. Therefore, there has been a problem in that it is not possible to meet the needs for further energy saving by supporting the door opening/closing operations of the train crew.

The present invention has been achieved in view of the above problems, and an objective of the present invention is to provide a train-information management device and a train-crew support method that can achieve further energy saving by supporting the train crew.

Solution to Problem

In order to solve the problem and achieve the objective, the present invention relates to a train-information management device that includes a central device that manages train information transferred to a train. A motorman's cab in the train is provided with a plurality of door operating switches that open and close train doors on a station-platform side in a fully-automatic manner or in a semi-automatic manner, or that open and close the doors only in sections. The central device includes an information control unit that specifies a stopping station where a train stops next on the basis of the train information, selects a recommended door operating switch for the stopping station from among the door operating switches on the basis of at least an estimated value of a number of passengers at the stopping station, a waiting time at the stopping station, and an operation mode of an air conditioner, and displays display information that prompts a train crew to operate the selected door operating switch on a display device in the control platform.

Advantageous Effects of Invention

According to the present invention, a door opening/closing operation of a train crew can be supported, resulting in achieving further energy savings.

BRIEF DESCRIPTION OF DRAWINGS

FIG. 6 is a diagram illustrating a function of a central device according to a second embodiment of the present invention.

FIG. 7 is a flowchart illustrating a recommended-operation determination process in the central device according to the second embodiment of the present invention.

FIG. 8 is a flowchart illustrating another recommended-operation determination process in the central device according to the second embodiment of the present invention.

DESCRIPTION OF EMBODIMENTS

Exemplary embodiments of a train-information management device and a train-crew support method according to the present invention will be described below in detail with reference to the accompanying drawings. The present invention is not limited to the embodiments.

First Embodiment

Figure 1:
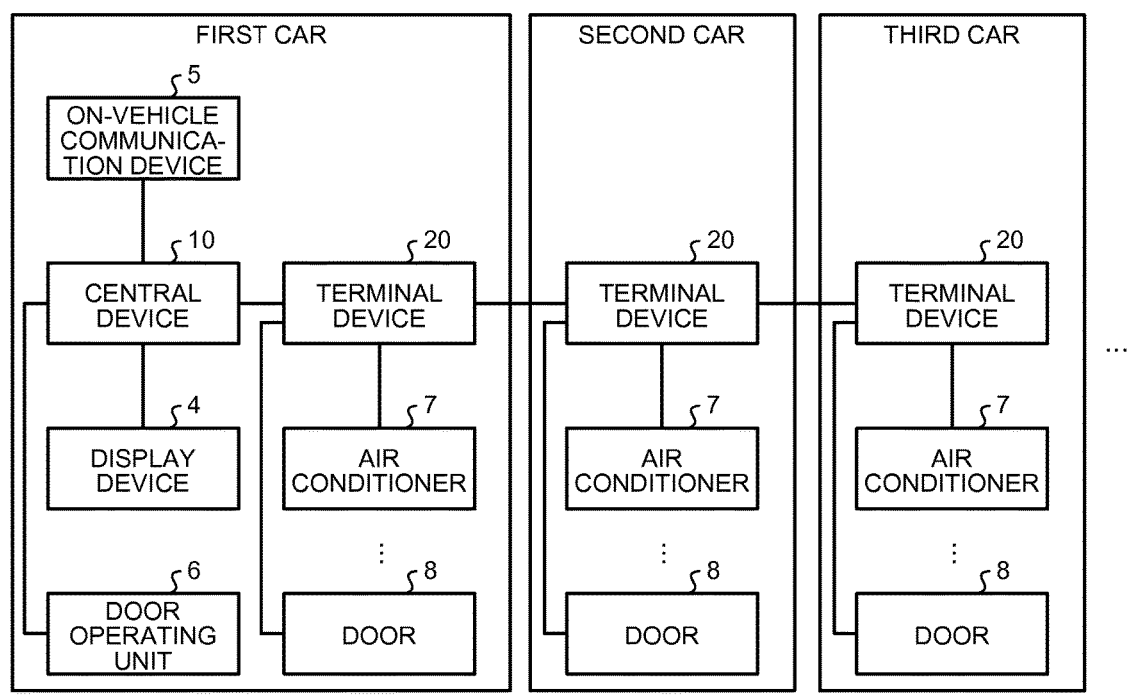
FIG. 1 is a diagram illustrating an example of on-vehicle devices including a train-information management device.
Figure 2:
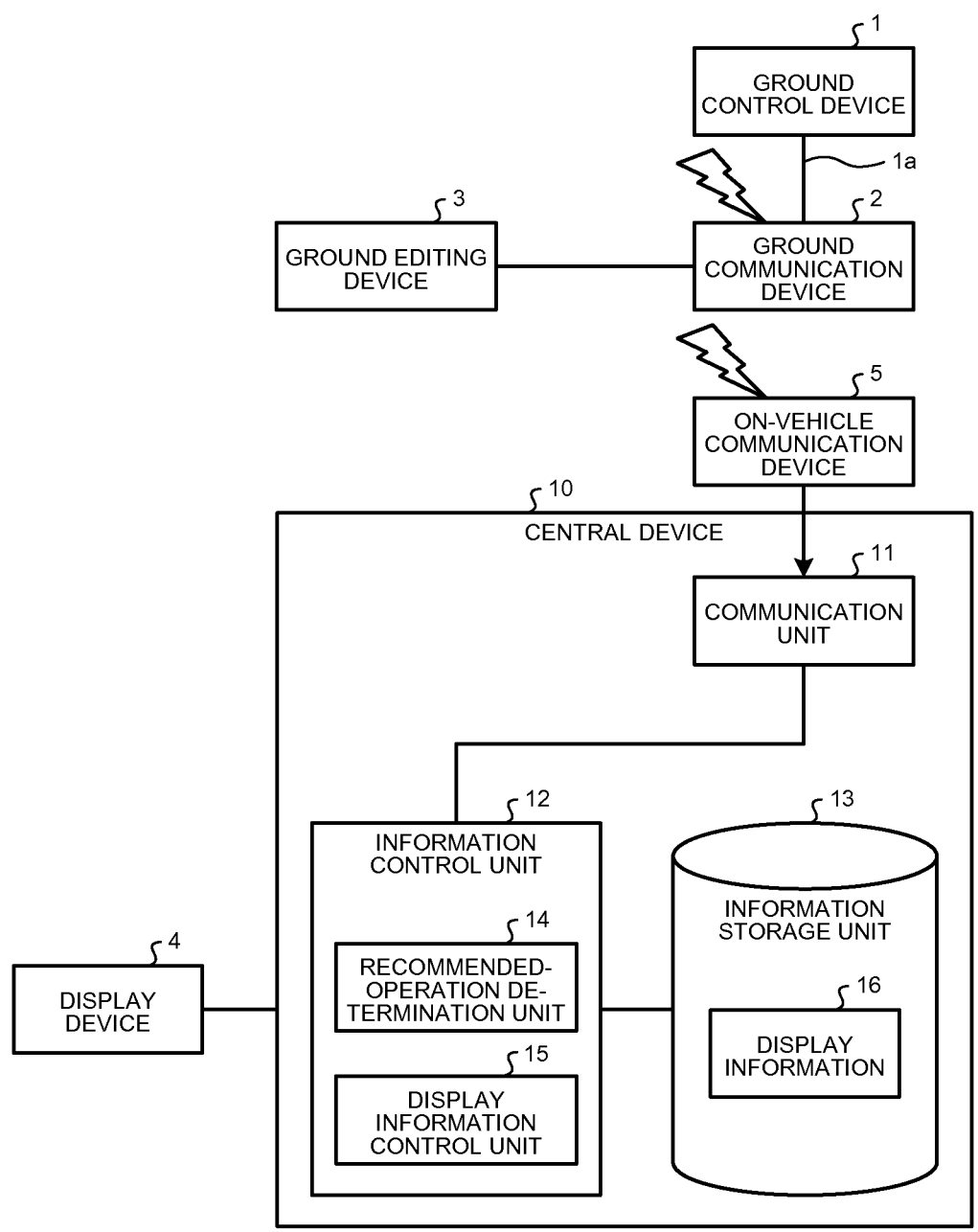
FIG. 2 is a diagram illustrating a function of a central device according to a first embodiment of the present invention.
Figure 3:
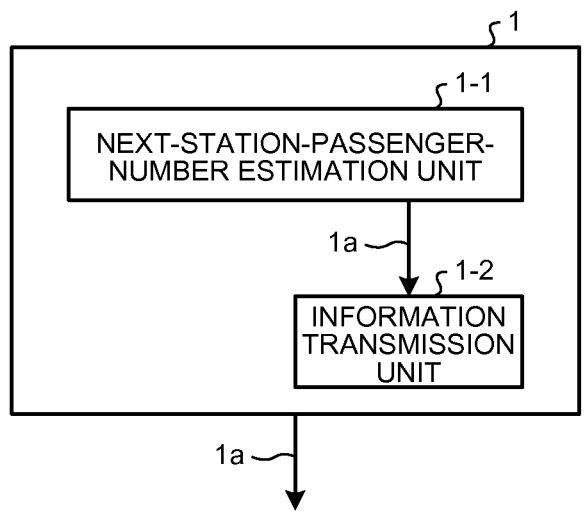
FIG. 3 is a diagram illustrating a configuration of a ground control device.
Figure 4:
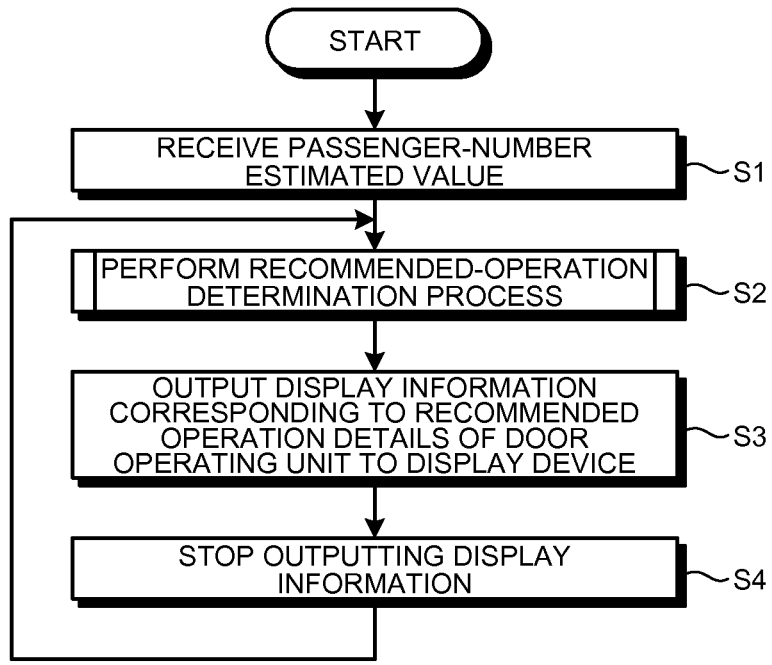
FIG. 4 is a flowchart illustrating an operation of the central device according to the first embodiment of the present invention.
Figure 5:
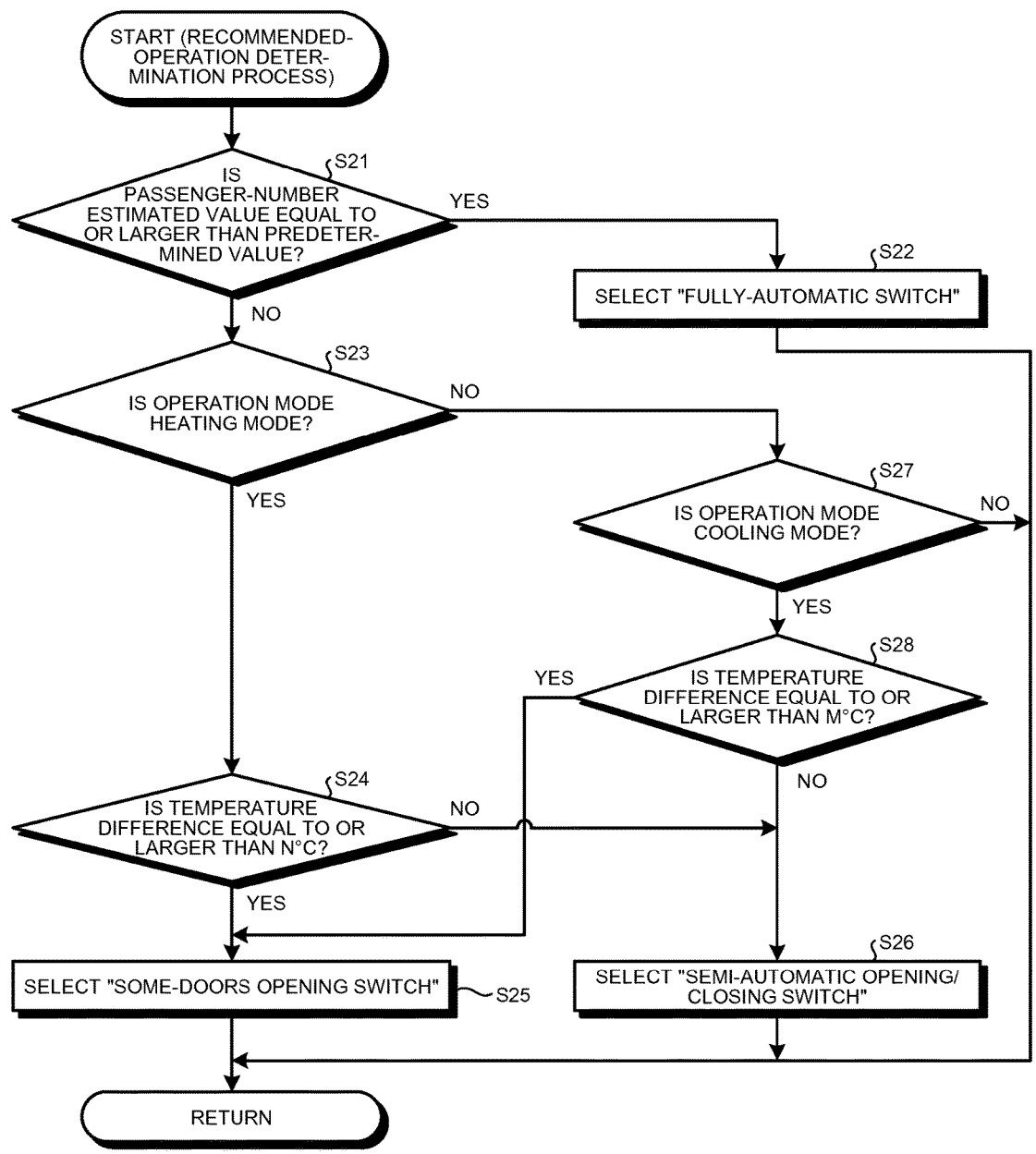
FIG. 5 is a flowchart illustrating a recommended-operation determination process in the central device according to the first embodiment of the present invention.

FIG. 1 is a diagram illustrating an example of on-vehicle devices including a train-information management device. FIG. 2 is a diagram illustrating a function of a central device according to a first embodiment of the present invention. FIG. 3 is a diagram illustrating a configuration of a ground control device. FIG. 4 is a flowchart illustrating an operation of the central device according to the first embodiment of the present invention. FIG. 5 is a flowchart illustrating a recommended-operation determination process in the central device according to the first embodiment of the present invention.

FIG. 1 illustrates a train that is constituted by a plurality of vehicles (for example, a first car to a third car), where the first car is the top vehicle, and the second car and the third car are cars in the middle, being connected in sequence starting from the first car. The first car includes, for example an on-vehicle communication device 5, a central device 10, a terminal device 20, a display device 4, a door operating unit 6, a plurality of air conditioners 7, and a plurality of doors 8. Each of the second and third cars includes the terminal device 20, a plurality of air conditioners 7, and a plurality of doors 8.

The on-vehicle communication device 5, the display device 4, the door operating unit 6, and the terminal device 20 are connected to the central device 10. Although not illustrated in FIG. 1, in addition to these elements, for example, a main controller (not illustrated) is also connected to the central device 10. The central device 10 performs input/output processing on various pieces of data.

Examples of information managed by the central device 10 (train information) include, in addition to display information 16 and the estimated passenger-number value 1a, which are described later, a train type, a train ID, running position information, an operation command from the main controller (not illustrated), state information of on-train devices, the waiting time at each station, line section information indicating the section of line over which the train will run (hereafter, running section), station information indicating stations where the train will stop (hereafter, stopping stations), route information indicating the route of the train, platform information indicating a direction of a platform, a door opening direction, and the number of vehicles accommodated by the platform. The central device 10 according to the present embodiment uses the train information to specify a stopping station where the train stops next; determines recommended operation details of the door operating unit 6 for the specified stopping station; and displays the determined operation details on the display device 4.

One or more terminal devices 20, for example, are provided in each vehicle, and the terminal devices 20 are connected to each other by an inter-vehicle communication path (not illustrated) and have a function of transmitting and receiving data to be transferred between vehicles. The terminal device 20 relays control information that is transmitted from the central device 10 to devices such as the door 8 and also relays state information from each device to the central device 10. While only the air conditioner 7 and the door 8 are illustrated as being connected to the terminal device 20 in FIG. 1, various types of devices (such as a propulsion control device, a brake control device, and a safety device) are in practice also incorporated in the train and these devices are connected to the terminal device 20. Further, the respective numbers of the terminal devices 20, the air conditioners 7, and the doors 8 are not limited to those illustrated in FIG. 1.

In FIG. 2, a ground communication device 2, a ground editing device 3, and a ground control device 1, or a control device provided trackside, are provided on the ground, or trackside. The ground communication device 2, for example, is provided at a station platform and the like and wirelessly communicates with the on-vehicle communication device 5. While FIG. 2 illustrates only one ground communication device 2, it is assumed that a plurality of ground communication devices 2 is provided so as to be communicable with a plurality of trains running on the route. The ground communication device 2 is connected to the ground editing device 3. In the ground editing device 3, the display information 16, described later, is edited, and data regarding the edited display information 16 is recorded in an information storage unit 13 via the ground communication device 2 and the on-vehicle communication device 5. The method of recording the display information 16 in the information storage unit 13 is not limited thereto, and it is also possible to record the display information 16 in a portable IC card and the like and to write the display information 16 in the information storage unit 13 with a data read unit (not illustrated) on the vehicle side.

The ground control device 1 is, for example, a device for controlling the operation of a train present on a railroad on the basis of train information from the train. FIG. 3 illustrates a next-station passenger-number estimation unit 1-1 and an information transmission unit 1-2 as an example of a function of the ground control device 1. The next-station passenger-number estimation unit 1-1 estimates the number of passengers at each station for every train, and then it outputs the estimated numbers as the estimated passenger-number value 1a.

For example, the numbers of passengers are estimated by analyzing boarding section information from commuter passes collected at stations in real time. Alternatively, the numbers of passengers are estimated by analyzing data captured by cameras provided at station platforms, or are estimated on the basis of statistical information on each of the stations measured taking into consideration the day of week, period of time, season, and the like.

The estimated passenger-number value 1a computed by the ground control device 1 is transmitted via the information transmission unit 1-2 to the ground communication device 2. Because the ground communication device 2 is provided so as to be communicable with a plurality of trains running on a route, the estimated passenger-number value 1a from the ground control device 1 is transmitted to each train in real time. While the present embodiment describes an example in which the estimated passenger-number value 1a computed by the ground control device 1 is wirelessly transmitted to the central device 10, it is also possible to have a configuration such that, for example, the estimated passenger-number value 1a for every station or every period of time is stored in an IC card and the like; the estimated passenger-number value 1a in this IC card is written to the information storage unit 13; and recommended operation details of the door operating unit 6 are determined by using the estimated passenger-number value 1a.

For example, the display device 4 is provided in a control platform and visualizes the state of on-vehicle devices and the like so as to notify a train crew of the information. For example, the display information 16 transmitted from the central device 10 is displayed on the display device 4.

The door operating unit 6 is provided in the leading vehicle, for example, and is used for executing door opening/closing control as operated by a train crew when the train stops at a platform. The door operating unit 6 includes switches such as a fully-automatic switch, a sectional door-opening switch, and a semi-automatic opening/closing switch. The types of these switches are only examples, and various types of switches in the door operating unit 6 may also be included, as possible switch choices, in a recommended-operation determination process, which is described later.

The central device 10 is configured to include a communication unit 11 that is an interface for connecting the central device 10 to the on-vehicle communication device 5; an information control unit 12; and the information storage unit 13. The display information 16 from the ground editing device 3 is stored in the information storage unit 13.

A recommended-operation determination unit 14 determines the recommended operation details of the door operating unit 6 on the basis of various pieces of information. A display information control unit 15 reads the display information 16 corresponding to an operation determined by the recommended-operation determination unit 14 from the information storage unit 13, and then it transmits the read display information 16 to the display device 4.

Next, operations of the present embodiment are described with reference also to FIGS. 4 and 5. The recommended-operation determination unit 14 receives the estimated passenger-number value 1a (Step S1). At this time, the recommended-operation determination unit 14 specifies the station where the train stops next and the side of the door 8 to be controlled on the basis of, for example, line section information, station information, route information, platform information, a door opening side, and the number of vehicles accommodated by a platform, all of which are pieces of information that are included in train information. Further, the recommended-operation determination unit 14 performs a recommended-operation determination process on the basis of the estimated passenger-number value 1a (Step S2).

When the estimated passenger-number value 1a is equal to or larger than a predetermined value (YES at Step S21), the recommended-operation determination unit 14 selects "fully-automatic switch" as a recommended switch for the door operating unit 6 (Step S22) because the convenience of passengers at the stopping station is prioritized.

When the estimated passenger-number value 1a is less than a predetermined value at Step S21 (NO at Step S21), the recommended-operation determination unit 14 determines the operation mode of the air conditioner 7 (Step S23).

When the operation mode is a heating mode (YES at Step S23), it is determined whether the temperature difference between the outside temperature and the in-vehicle temperature is equal to or larger than a predetermined value (N° C.: such as 15° C.) on the basis of temperature information obtained from a temperature sensor in the air conditioner 7 (Step S24).

When the temperature difference is, for example, equal to or larger than N° C. (YES at Step S24), there is a risk that the in-vehicle temperature decreases rapidly at a certain station set in advance, during a specified time period set in advance, or the like. Therefore, the recommended-operation determination unit 14 selects "sectional door-opening switch" as a recommended switch for the door operating unit 6 (Step S25).

On the other hand, when the temperature difference is less than N° C. (NO at Step S24), in order to prevent a decrease in the in-vehicle temperature and to take the convenience of passengers into consideration, the recommended-operation determination unit 14 selects the "semi-automatic opening/closing switch" as a recommended switch for the door operating unit 6 (Step S26).

At Step S23, when the operation mode is not a heating mode (NO at Step S23), it is determined whether the operation mode is a cooling mode. When the operation mode is a fanning mode (NO at Step S27), the process returns to the process illustrated in FIG. 4. When the operation mode is a cooling mode (YES at Step S27), it is determined whether the temperature difference between the outside temperature and the in-vehicle temperature is equal to or larger than a predetermined value (M° C.: such as 10° C.) on the basis of the temperature information obtained from a temperature sensor in the air conditioner 7 (Step S28).

When, for example, the temperature difference is equal to or larger than M° C. (YES at Step S28), outside air flows in vehicles and thus the power consumed by the air conditioner 7 is increased, for example, in summer. Accordingly, the recommended-operation determination unit 14 selects "sectional door-opening switch" as a recommended switch for the door operating unit 6 (Step S25).

Meanwhile, when the temperature difference is less than M° C. (NO at Step S28), in order to prevent an increase in the power consumed by the air conditioner 7 and taking the convenience of passengers into consideration, the recommended-operation determination unit 14 selects "semi-automatic opening/closing switch" as a recommended switch for the door operating unit 6 (Step S26).

The description returns here to the process of FIG. 4. The display information control unit 15 reads the display information 16 corresponding to the operation details recommended by the recommended-operation determination unit 14 from the information storage unit 13, and then it outputs the read display information 16 to the display device 4 (Step S3). In the display device 4 having received the display information 16 from the display information control unit 15, the recommended operation details are displayed as, for example, "recommended door operation at next station is 'semi-automatic'". With this display, a train crew can easily check the recommended operation details.

Thereafter, when the train arrives at a station, the door operating unit 6 is operated according to the operation details displayed on the display device 4. For example, when the displayed operation detail is "semi-automatic opening/closing switch", a semi-automatic command is output from the door operating unit 6 to the doors 8 of the respective vehicles. Thus, the state of the doors 8 of the respective vehicles becomes unlocked (the semi-automatic state). When the doors 8 are in the semi-automatic state, passengers can open or close the doors 8 by using a door switch near the doors. Subsequently, when the train starts to run, if a switch for closing all of the doors 8 is operated in the door operating unit 6, a close command is output from the door operating unit 6 to the doors 8 of the respective vehicles. With this close command, the semi-automatic state of the doors 8, is canceled and all the open doors 8 are closed and locked at the same time.

When the semi-automatic state of the doors 8 is canceled, the operations of door switches near the doors become invalid, and thus passengers cannot open these doors. However, when the displayed operation detail is "sectional door-opening switch", an open commend is output to only some of a plurality of doors of the respective vehicles on the station-platform side. With the open command, only some predetermined doors are opened. When a switch for closing all of the doors 8 at the same time is operated in the door operating unit 6, a close command is output from the door operating unit 6 to the open doors 8, and with this close command, the doors 8 are closed and locked.

For example, when the display information control unit 15 receives a door close command from the door operating unit 6, the display information control unit 15 stops outputting the display information 16 to the display device 4; and the message described above is reset on the display device 4 (Step S4). Thereafter, the recommended-operation determination process is performed again in the recommended-operation determination unit 14.

As described above, the train-information management device according to the present embodiment includes the central device 10 that manages train information transferred into a train. In the motorman's cab, a plurality of door operating switches that opens and closes train doors on the station-platform side in a fully-automatic manner or in a semi-automatic manner or that open and close doors only by section (for example, at least two of a fully-automatic switch, a sectional door-opening switch, and a semi-automatic opening/closing switch) are provided. The central device 10 includes the information control unit 12 that specifies a stopping station where the train stops next on the basis of the train information; selects a door operating switch recommended for the stopping station from among the door operating switches on the basis of at least an estimated value of the number of passengers at the stopping station (the estimated passenger-number value 1a), a waiting time at the stopping station, and an operation mode of the air conditioner; and displays the display information that prompts a train crew to operate the selected door operating switch on a display device in the control platform. With this configuration, the train crew can easily check the recommended operation details and operate the door operating switch provided in the door operating unit 6 according to the operation details. Therefore, when it is desirable to operate the sectional door-opening switch or the semi-automatic opening/closing switch because the number of passengers at a stopping station is relatively small, the fully-automatic switch is not operated, thereby achieving an energy saving. When it is desirable to prioritize the convenience of passengers because the number of passengers at a stopping station is relatively large, it is possible to prompt a train crew to operate the fully-automatic switch.

Furthermore, the information control unit 12 is configured to use the estimated passenger-number value 1a of a train that is estimated by the ground control device 1 that controls the operation of a train on a railroad as an estimated value. Due to this configuration, the information control unit 12 can determine the operation details by using the estimated passenger-number value 1a that is updated in real time, and thus a train crew can operate the door operating unit 6 according to the latest determination result.

Second Embodiment

FIG. 6 is a diagram illustrating a function of a central device according to a second embodiment of the present invention. FIG. 7 is a flowchart illustrating a recommended-operation determination process in the central device according to the second embodiment of the present invention. The second embodiment is different from the first embodiment in that the occupancy of a vehicle, or vehicle occupancy 30a from a vehicle-occupancy detection device 30 is input to the central device 10 and the recommended-operation determination unit 14 performs a recommended-operation determination process by using the vehicle occupancy 30a instead of the estimated passenger-number value 1a. In the following descriptions, like parts as those in the first embodiment are denoted by like reference signs and descriptions thereof will be omitted and only the parts different from the first embodiment are described.

The recommended-operation determination unit 14 illustrated in FIG. 6, for example, performs a recommended-operation determination process on the basis of train operation information and running position information that are managed by the central device 10 as well as the vehicle occupancy 30a from the vehicle-occupancy detection device 30.

Operations of the present embodiment are described in the following. The recommended-operation determination unit 14 specifies a station where the train stops next and the direction of the door 8 to be controlled on the basis of train information managed by the central device 10. Further, the recommended-operation determination unit 14 performs the recommended-operation determination process on the basis of the vehicle occupancy 30a.

It is assumed that as the vehicle occupancy 30a becomes higher, the number of passengers at a stopping station becomes larger. Accordingly, when the vehicle occupancy 30a is equal to or larger than a predetermined value (YES at Step S31), in order to prioritize the convenience of passengers at the stopping station, the recommended-operation determination unit 14 selects "fully-automatic switch" as a recommended switch for the door operating unit 6 when the train arrives at the next station (Step S32). The predetermined value used at Step S31 is set to be different from the predetermined value at Step S21 in the first embodiment.

When the vehicle occupancy 30a is less than a predetermined value (NO at Step S31), the recommended-operation determination unit 14 determines the operation mode of the air conditioner 7 (Step S33). When the operation mode is a heating mode (YES at Step S33), it is determined whether the temperature difference between the outside temperature and the in-vehicle temperature is equal to or larger than a predetermined value (N° C.: such as 15° C.) on the basis of temperature information obtained from a temperature sensor of the air conditioner 7 (Step S34).

When, for example, the temperature difference is equal to or larger than N° C. (YES at Step S34), the recommended-operation determination unit 14 selects "sectional door-opening switch" as a recommended switch for the door operating unit 6 (Step S35). When the temperature difference is less than N° C. (NO at Step S34), the recommended-operation determination unit 14 selects "semi-automatic opening/closing switch" as a recommended switch for the door operating unit 6 (Step S36).

At Step S33, when the operation mode is not a heating mode (NO at Step S33), it is determined whether the operation mode is a cooling mode. When the operation mode is a fanning mode (NO at Step S37), the process returns to the process of FIG. 4. When the operation mode is a cooling mode (YES at Step S37), it is determined whether the temperature difference between the outside temperature and the in-vehicle temperature is equal to or larger than a predetermined value (M° C.: such as 10° C.) on the basis of the temperature information obtained from a temperature sensor of the air conditioner 7 (Step S38).

When, for example, the temperature difference is equal to or larger than M° C. (YES at Step S38), the recommended-operation determination unit 14 selects "sectional door-opening switch" as a recommended switch for the door operating unit 6 (Step S35). When the temperature difference is less than M° C. (NO at Step S38), the recommended-operation determination unit 14 selects "semi-automatic opening/closing switch" as a recommended switch for the door operating unit 6 (Step S36). Subsequent operations are identical to those of the first embodiment, and thus descriptions thereof will be omitted.

As described above, according to the train-information management device of the present embodiment, recommended operation details of the door operating unit 6 are determined by using at least the vehicle occupancy 30a detected inside a train, a waiting time at a stopping station, and an operation mode of the air conditioner. Therefore, although the estimation accuracy of the number of passengers at a station where a train stops might be less than that of the first embodiment, the operation details can be determined without using the estimated passenger-number value 1a from the ground control device 1, and a recommended switch for the door operating unit 6 can be determined even when it is not possible to wirelessly communicate with the ground, or trackside.

FIG. 8 is a flowchart illustrating another recommended-operation determination process in the central device according to the second embodiment of the present invention. It is also possible that the central device 10 is configured to determine operation details on the basis of the vehicle occupancy 30a from a vehicle-occupancy detection device provided in a train, in addition to the estimated passenger-number value 1a, the waiting time at a stopping station, and the operation mode of the air conditioner.

When the estimated passenger-number value 1a is equal to or larger than a predetermined value (YES at Step S41), the recommended-operation determination unit 14 selects "fully-automatic switch" as a recommended switch for the door operating unit 6 (Step S42).

At Step S41, when the estimated passenger-number value 1a is less than a predetermined value (NO at Step S41), the recommended-operation determination unit 14 determines what the operation mode is of the air conditioner 7 (Step S43).

When the operation mode is a heating mode (YES at Step S43), it is determined whether the temperature difference between the outside temperature and the in-vehicle temperature is equal to or larger than a predetermined value (N° C.: such as 15° C.) on the basis of temperature information obtained from a temperature sensor in the air conditioner 7 (Step S44).

When, for example, the temperature difference is equal to or larger than N° C. (YES at Step S44), it is determined whether the vehicle occupancy 30a is equal to or larger than a predetermined value. When the vehicle occupancy 30a is equal to or larger than a predetermined value (YES at Step S45), "fully-automatic switch" is selected as a recommended switch for the door operating unit 6. That is, even when the temperature difference is determined to be equal to or larger than N° C. at Step S44, furthermore, if the vehicle occupancy 30a is equal to or larger than a predetermined value, it is presumed that the number of passengers at a stopping station is large. Therefore, the recommended-operation determination unit 14 selects "fully-automatic switch" by taking passenger convenience into account.

When the vehicle occupancy 30a is less than a predetermined value (NO at Step S45), the in-vehicle temperature possibly decreases rapidly, for example, in cold areas or in winter. Accordingly, the recommended-operation determination unit 14 selects "sectional door-opening switch" as a recommended switch of the door operating unit 6 (Step S46).

When the temperature difference is less than N° C. at Step S44 (NO at Step S44), it is determined whether the vehicle occupancy 30a is equal to or larger than a predetermined value. When the vehicle occupancy 30a is equal to or larger than a predetermined value (YES at Step S49), the recommended-operation determination unit 14 selects "fully-automatic switch" by taking passenger convenience into account at a stopping station. When the vehicle occupancy 30a is less than a predetermined value (NO at Step S49), in order to prevent a decrease in the in-vehicle temperature and so as to take passenger convenience into account, the recommended-operation determination unit 14 selects "semi-automatic opening/closing switch" (Step S50).

When the operation mode is not a heating mode at Step S43 (NO at Step S43), it is determined whether the operation mode is a cooling mode. When the operation mode is a fanning mode (NO at Step S47), the process returns to the process of FIG. 4. When the operation mode is a cooling mode (YES at Step S47), then, it is determined whether the temperature difference between the outside temperature and the in-vehicle temperature is equal to or larger than a predetermined value (M° C.: such as 10° C.) on the basis of the temperature information obtained from a temperature sensor in the air conditioner 7 (Step S48). When the temperature difference is equal to or larger than M° C. (YES at Step S48), the process at Step S45 is performed; and when the temperature difference is less than M° C. (NO at Step S48), the process at Step S49 is performed. In this manner, by combining the estimated passenger-number value 1a and the vehicle occupancy 30a, the information control unit 12 can determine operation details more accurately than that of the first embodiment.

The train-information management device according to the embodiments of the present invention is only an example of the contents of the present invention. The train-information management device can be combined with other well-known techniques, and it is not necessary to mention that the present invention can be configured while modifying it without departing from the scope of the invention, such as omitting a part its configuration.

INDUSTRIAL APPLICABILITY

As described above, the present invention is applicable to a train-information management device, and is useful as an invention that can achieve further energy saving while supporting the train crew.

REFERENCE SIGNS LIST 1 ground control device, 1-1 next-station-passenger-number estimation unit, 1-2 information transmission unit, 1a estimated passenger-number value, 2 ground communication device, 3 ground editing device, 4 display device, 5 on-vehicle communication device, 6 door operating unit, 7 air conditioner, 8 door, 10 central device, 11 communication unit, 12 information control unit, 13 information storage unit, 14 recommended-operation determination unit, 15 display information control unit, 16 display information, 20 terminal device, 30 vehicle-occupancy detection device, 30a vehicle occupancy.

The invention claimed is:

1. A train-information management device comprising a central device that manages train information transferred to a train, wherein
a motorman's cab in the train is provided with a plurality of door operating switches
that open and close train doors on a station-platform side in a fully-automatic manner or in a semi-automatic manner, or
that open and close the doors only in sections, and
the central device includes an information control unit that
specifies a stopping station where a train stops next on the basis of the train information,
selects a recommended door operating switch for the stopping station from among the door operating switches on the basis of at least an estimated value of a number of passengers at the stopping station, a waiting time of the train at the stopping station, and an operation mode of an air conditioner, and
displays display information that prompts a train crew to operate the selected door operating switch on a display device in the control platform.

2. The train-information management device according to claim 1, wherein
the information control unit uses an estimated passenger-number value of a train, which is estimated by a ground control device that controls an operation of a train on a railroad, as the estimated value.

3. The train-information management device according to claim 2, wherein
the information control unit selects a recommended door operating switch for a stopping station from among the respective door operating switches on the basis of vehicle occupancy obtained from a vehicle-occupancy detection device incorporated in the train, in addition to the estimated value, the waiting time, and the operation mode.

4. A train-information management device comprising a central device that manages train information transferred to a train, wherein
a motorman's cab in the train is provided with a plurality of door operating switches
that open and close train doors on the station-platform side in a fully-automatic manner or in a semi-automatic manner, or
that open and close the doors only in sections, and
the central device includes an information control unit that
specifies a stopping station where a train stops next on the basis of the train information,
selects a recommended door operating switch for the stopping station from among the door operating switches on the basis of at least vehicle occupancy obtained from a vehicle-occupancy detection device provided in a train, a waiting time of the train at the stopping station, and an operation mode of an air conditioner, and
displays display information that prompts a train crew to operate the selected door operating switch on a display device in the control platform.

5. A train-crew support method that
is applied to a train including
a plurality of door operating switches that open and close train doors on the station-platform side in a fully-automatic manner, in a semi-automatic manner, or in a manner such that the doors open and close only in sections and
a display device for displaying train information and
that supports operations of the door operating switches by a train crew, the method comprising:
a selecting step of
specifying a stopping station where a train stops next on the basis of the train information and
selecting a recommended door operating switch for the stopping station from among the door operating switches on the basis of an estimated value of a number of passengers at the stopping station, a waiting time of the train at the stopping station, and an operation mode of an air conditioner;
a transmitting step of transmitting, to a display device in a control platform, display information that prompts a train crew to operate the door operating switch selected at the selecting step; and
a displaying step of visualizing and displaying display information transmitted at the transmitting step on the display device.

6. A train-crew support method
that is applied to a train including a plurality of door operating switches that open and close train doors on a side of a station platform in a fully-automatic manner or in a semi-automatic manner or that open and close doors only partially and a display device for displaying train information, and
that supports operations of the door operating switches by a train crew, the method comprising:
a selecting step of
specifying a stopping station where the train stops next on the basis of the train information and
selecting a recommended door operating switch for the stopping station from among the door operating switches on the basis of vehicle occupancy from a vehicle-occupancy detection device provided in a train, a waiting time of the train at the stopping station, and an operation mode of an air conditioner;
a transmitting step of transmitting display information that prompts a train crew to operate a door operating switch selected at the selecting step to a display device in a control platform; and
a displaying step of visualizing and displaying display information transmitted at the transmitting step on the display device.

* * * * *